(12) United States Patent
Zink et al.

(10) Patent No.: US 11,912,209 B2
(45) Date of Patent: Feb. 27, 2024

(54) REMOVABLE PANEL RETAINER FOR A VEHICLE

(71) Applicant: GM Global Technology Operations LLC, Detroit, MI (US)

(72) Inventors: Jason Zink, Rochester Hills, MI (US); Mark A. Ruttle, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 17/544,214

(22) Filed: Dec. 7, 2021

(65) Prior Publication Data

US 2023/0174001 A1    Jun. 8, 2023

(51) Int. Cl.
*B60R 13/08* (2006.01)

(52) U.S. Cl.
CPC .................. *B60R 13/08* (2013.01)

(58) Field of Classification Search
CPC ............... B60R 13/08; B62D 33/0207; B62D 33/0273; B62D 27/06; B60J 1/20
USPC ........................................... 296/24.4, 190.11
See application file for complete search history.

(56) References Cited

U.S. PATENT DOCUMENTS

| | | | | |
|---|---|---|---|---|
| 6,513,863 B1* | 2/2003 | Renke | ..................... | B60P 3/423 296/57.1 |
| 6,796,600 B1* | 9/2004 | Ferer | ..................... | B60P 3/423 296/37.6 |
| 7,036,872 B1* | 5/2006 | Czirmer | ................. | B60J 1/1861 296/26.11 |
| 9,903,400 B2* | 2/2018 | Nola | ................... | B60R 13/0838 |
| 10,968,010 B1* | 4/2021 | Zabaleta | ................ | B65D 41/04 |
| 2009/0096252 A1* | 4/2009 | Gordon | ..................... | B60J 5/103 296/190.11 |
| 2011/0215598 A1* | 9/2011 | Scherr | .................. | B62D 33/037 292/196 |

\* cited by examiner

*Primary Examiner* — Pinel E Romain
(74) *Attorney, Agent, or Firm* — CANTOR COLBURN LLP (57) ABSTRACT

A removable panel retainer includes a flexible substrate having a surface defining a first axis. A clip member is moveably mounted to the flexible substrate in a direction substantially parallel to the first axis. A release member is moveably mounted relative to the flexible substrate along a second axis that is distinct from the first axis. Shifting the release member towards the flexible substrate releases the clip member to shift along the first axis.

20 Claims, 7 Drawing Sheets

REMOVABLE PANEL RETAINER FOR A VEHICLE

INTRODUCTION

The subject disclosure relates to the art of vehicles and, more particularly, to a retainer for a removable vehicle panel.

Many vehicles include removable panels that allow a user to create multiple vehicle configurations. Removable panels include roof panels, door panels, as well as window panels. Typically, the removable panels are stored away from the vehicle or in a compartment, such as a trunk, in the vehicle. Storing removable panels away from the vehicle, such as at home, can create issues if a reconfiguration is needed quickly. That is, a change in weather such as precipitation and or temperature may drive an owner to replace the removable panels. If they are not with the vehicle, the owner may be out of luck.

Storing panels in the trunk also has drawbacks. The panels may take up a lot of room in the truck that could limit additional storage possibilities. Further, straps or other tie downs are necessary to prevent panels from shifting and becoming damaged. Accordingly, it is desirable to provide a storage system that allows the removable panels to stay with the vehicle, keeps the removable panels safe, and does not take up valuable cargo/storage space.

SUMMARY

Disclosed, in accordance with a non-limiting example, is a removable panel retainer for a vehicle. The removable panel retainer includes a flexible substrate having a surface defining a first axis. A clip member is moveably mounted to the flexible substrate in a direction substantially parallel to the first axis. A release member is moveably mounted relative to the flexible substrate along a second axis that is distinct from the first axis. Shifting the release member towards the flexible substrate releases the clip member to shift along the first axis.

In addition to one or more of the features described herein the flexible substrate comprises a housing mounted to a surface in the vehicle, the housing including at least one cantilevered flexible hook element.

In addition to one or more of the features described herein the clip member includes a first section, a second section, and a third section, the second section being spaced from and joined to the first section by the third section.

In addition to one or more of the features described herein the second section includes a removable panel retainer.

In addition to one or more of the features described herein the release member includes an actuator element and a blocking member that extends outwardly from the actuator element, the blocking member selectively engaging the second section of the clip member.

In addition to one or more of the features described herein the blocking member includes a hollow interior and the actuator element includes a channel that is selectively receptive of the at least one cantilevered hook element.

In addition to one or more of the features described herein the housing includes a spring support member that selectively extends into the hollow interior of the blocking member.

In addition to one or more of the features described herein a spring is arranged on the spring support member, the spring biasing the release member away from the housing along the second axis.

In addition to one or more of the features described herein a spring is arranged between the third section and the housing, the spring biasing the clip member along the first axis toward the at least one cantilevered flexible hook element.

In addition to one or more of the features described herein the third section includes a spring support, the spring being arranged about the spring support.

Also disclosed, in accordance with a non-limiting example, is a vehicle including a body having a removable panel and a surface defining a first axis. A plurality of wheels support the body. A removable panel retainer is mounted to the surface. The removable panel retainer includes a flexible substrate defined on the surface. A clip member moveably mounted to the flexible substrate in a direction substantially parallel to the first axis. A release member is moveably mounted relative to the flexible substrate along a second axis that is distinct from the first axis. Shifting the release member towards the flexible substrate releases the clip member to shift along the first axis.

In addition to one or more of the features described herein the flexible substrate comprises a housing mounted to a surface in the vehicle, the housing including at least one cantilevered flexible hook element.

In addition to one or more of the features described herein the clip member includes a first section, a second section, and a third section, the second section being spaced from and joined to the first section by the third section.

In addition to one or more of the features described herein the second section includes a removable panel retainer.

In addition to one or more of the features described herein the release member includes an actuator element and a blocking member that extends outwardly from the actuator element, the blocking member selectively engaging the second section of the clip member.

In addition to one or more of the features described herein the blocking member includes a hollow interior and the actuator element includes a channel that is selectively receptive of the at least one cantilevered hook element.

In addition to one or more of the features described herein the housing includes a spring support member that selectively extends into the hollow interior of the blocking member.

In addition to one or more of the features described herein a spring is arranged on the spring support member, the spring biasing the release member away from the housing along the second axis.

In addition to one or more of the features described herein a spring is arranged between the third section and the housing, the spring biasing the clip member along the first axis toward the at least one cantilevered flexible hook element.

In addition to one or more of the features described herein the third section includes a spring support, the spring being arranged about the spring support.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1A:
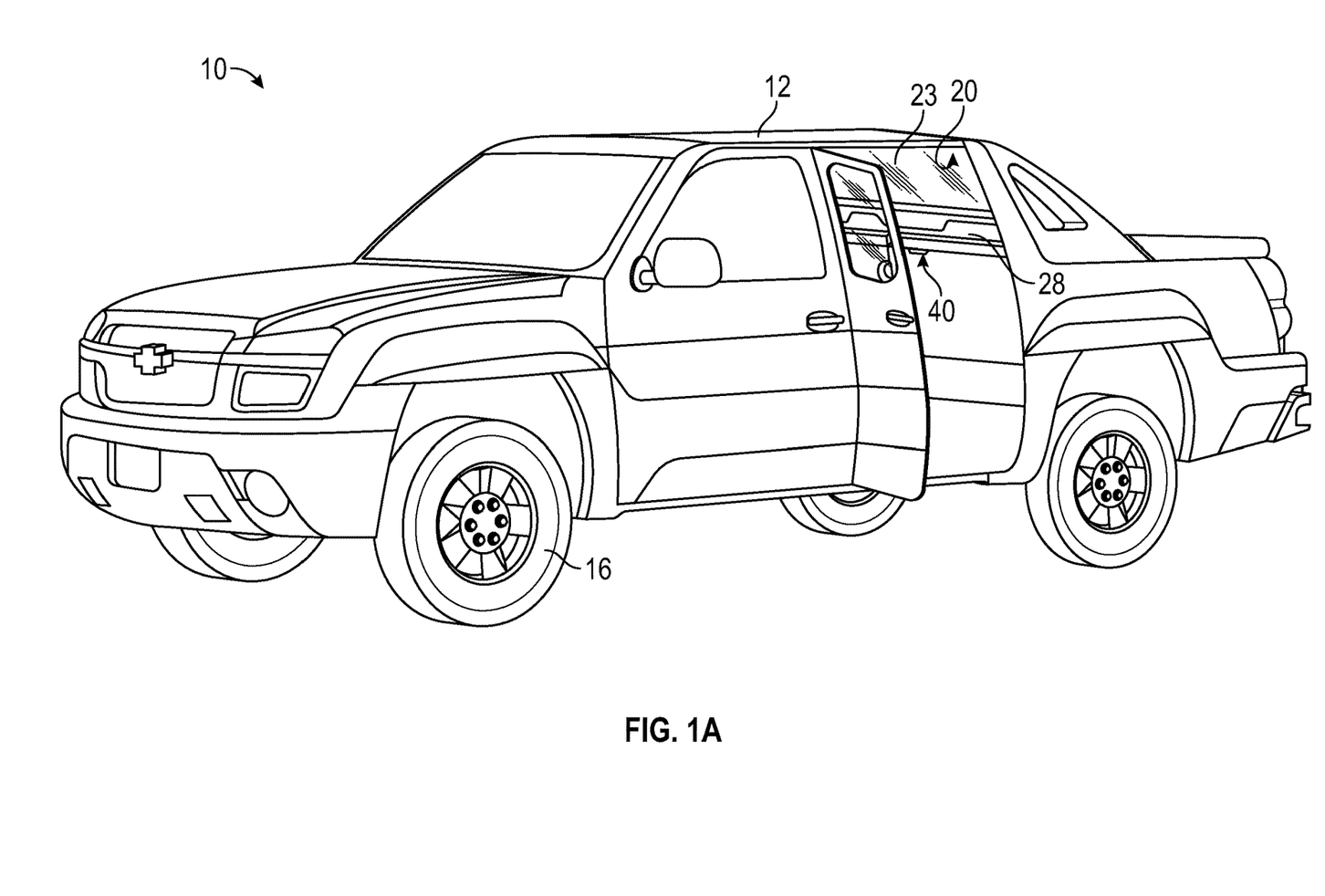
FIG. 1A depicts a vehicle having a removable panel and a removable panel retainer, in accordance with a non-limiting example.
Figure 1B:
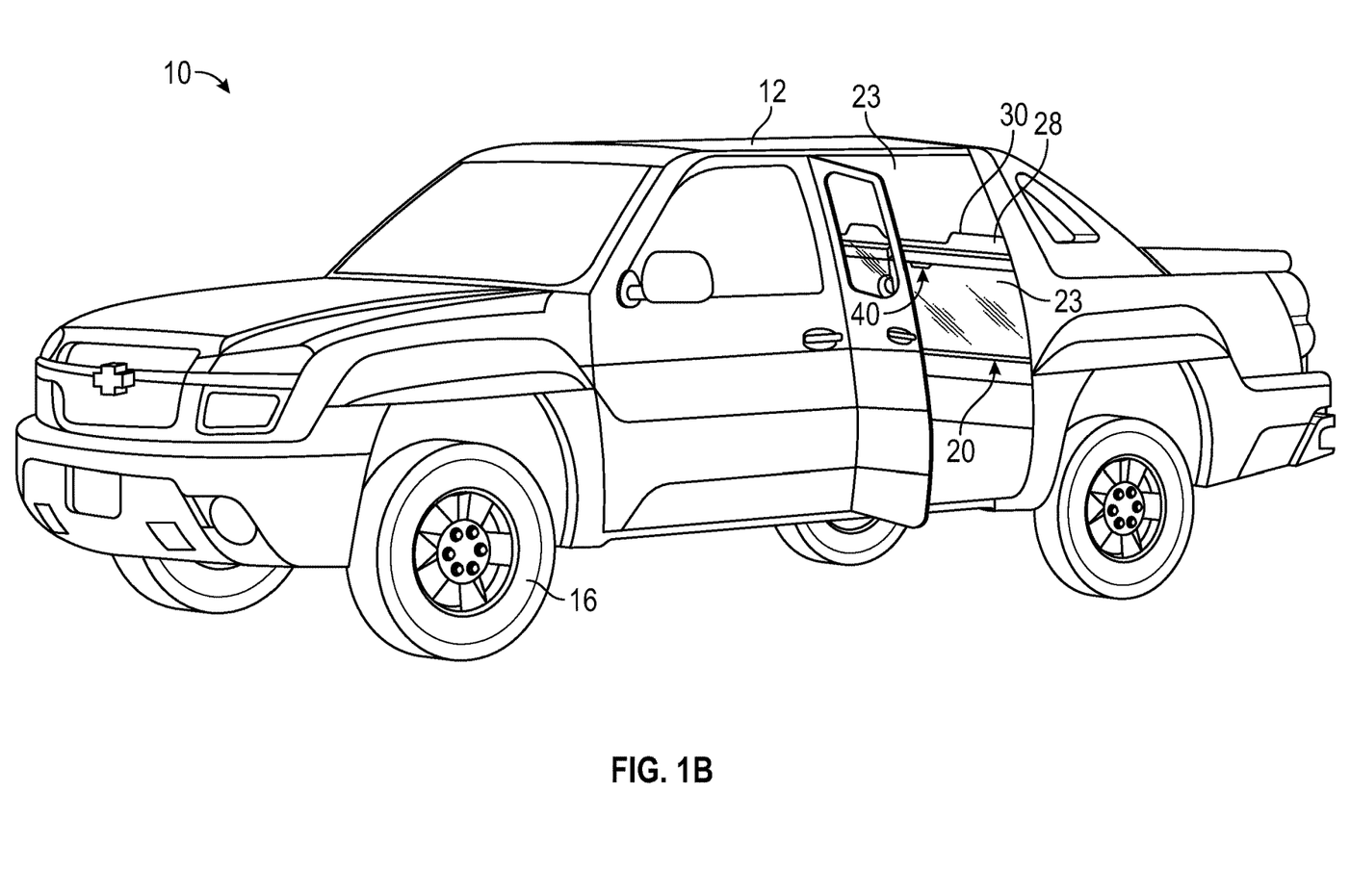
FIG. 1B depicts the vehicle of FIG. 1A with the removable panel removed and held in place by the removeable panel retainer, in accordance with a non-limiting example.

A vehicle, in accordance with a non-limiting example, is indicated at 10 in FIGS. 1A and 1B. Vehicle 10 includes a body 12 that is supported by a frame (not shown) and a plurality of wheels, one of which is indicated at 16. Vehicle 10 includes a removable panel 20 that may take form of a glass window 23 mounted in a midgate 28 of body 12. In a non-limiting example, removable panel 20 may be reconfigured so as to transform vehicle 10 between a first configuration in which removable panel 20 is coupled to midgate 28 and a second, more open configuration in which removeable panel 20 is removed creating an opening 30 in midgate 28. In a non-limiting example, vehicle 10 includes a removable panel retainer 40 mounted to midgate 28. Removable panel retainer 40 supports and secures removable panel 20 to midgate 28 when not installed in vehicle 10.

Figure 2A:
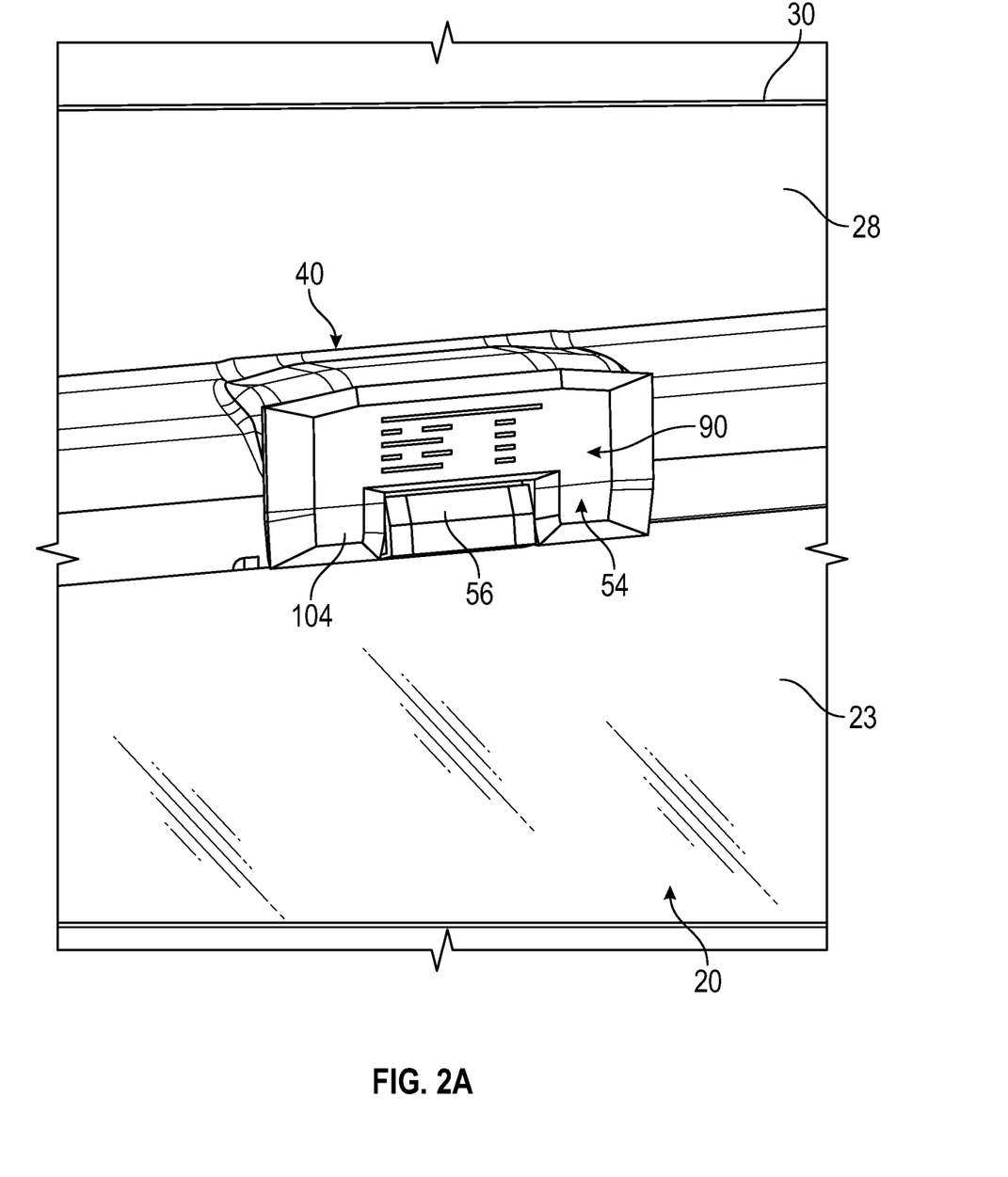
FIG. 2A depicts an upper right perspective view of the removable panel being placed against the panel retainer of FIG. 1B, in accordance with a non-limiting example.
Figure 2B:
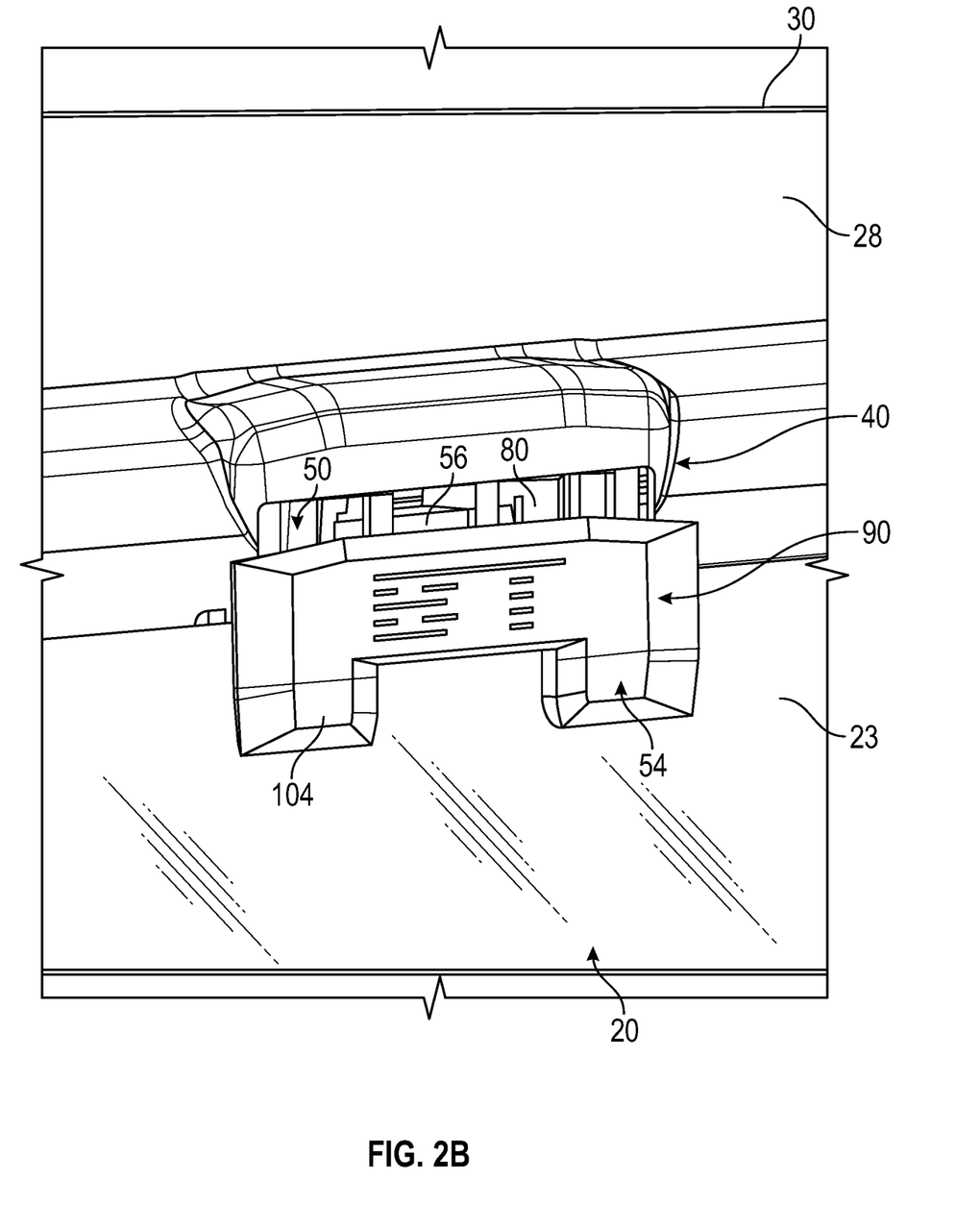
FIG. 2B depicts an upper right perspective view of the removable panel secured by the panel retainer of FIG. 2A, in accordance with a non-limiting example.
Figure 3:
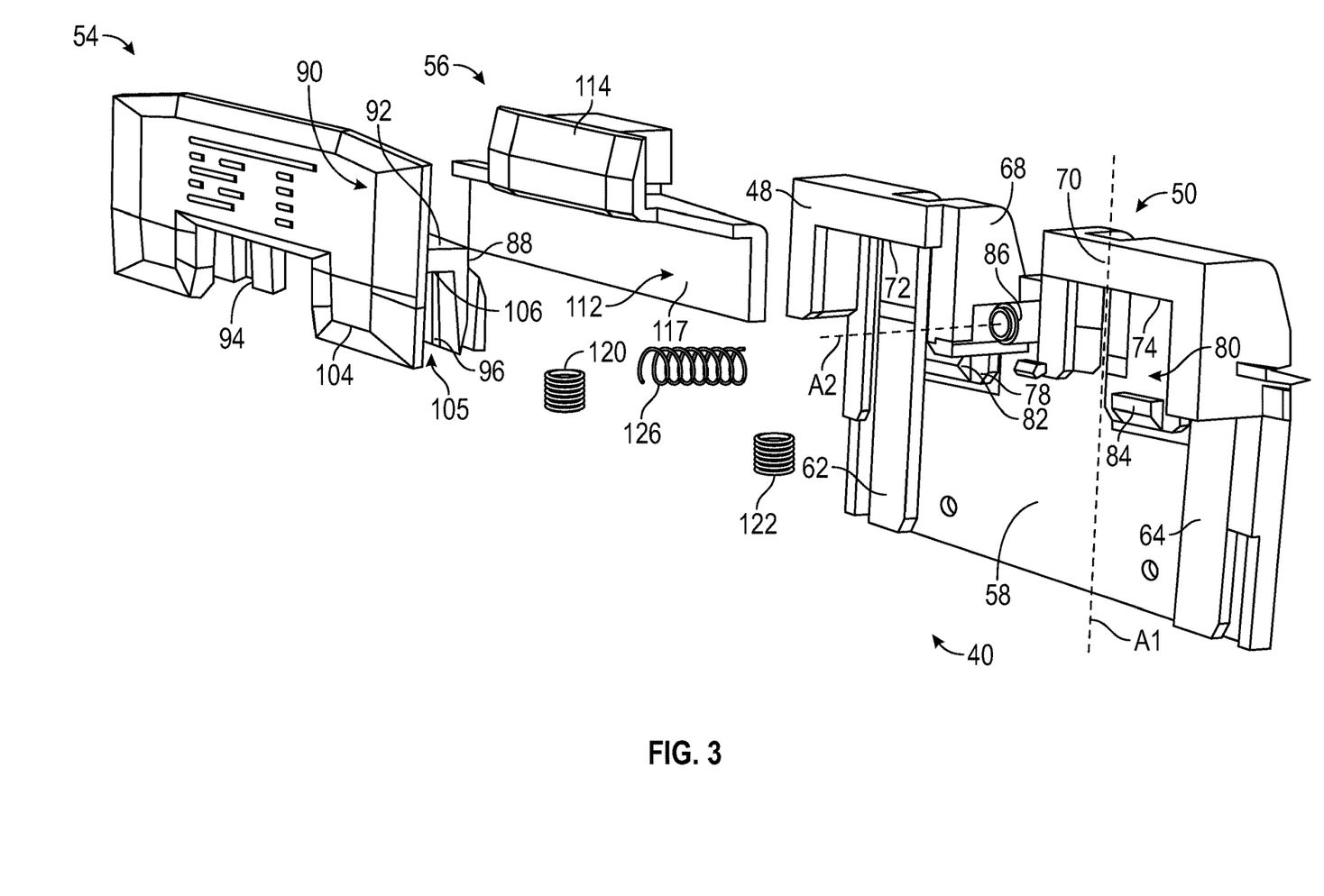
FIG. 3 depicts a disassembled view of the removable panel retainer of FIG. 1, in accordance with a non-limiting example.

Referring to FIGS. 2A, 2B, and 3, removable panel retainer 40 includes a flexible substrate 48 that may take the form of a housing 50. Of course, it should be understood, that in other non-limiting examples, flexible substrate 48 may represent pliable or bendable sections (not shown) of midgate 28. Removable panel retainer 40 also includes a clip member 54 and a release member 56. In a non-limiting example, housing 50 includes a surface 58 that defines a first axis "A1". First surface 58 includes a first guide 62 and a second guide 64. First and second guides 62 and 64 control movement of clip member 54 relative to surface 58 along the first axis "A1".

Figure 4:
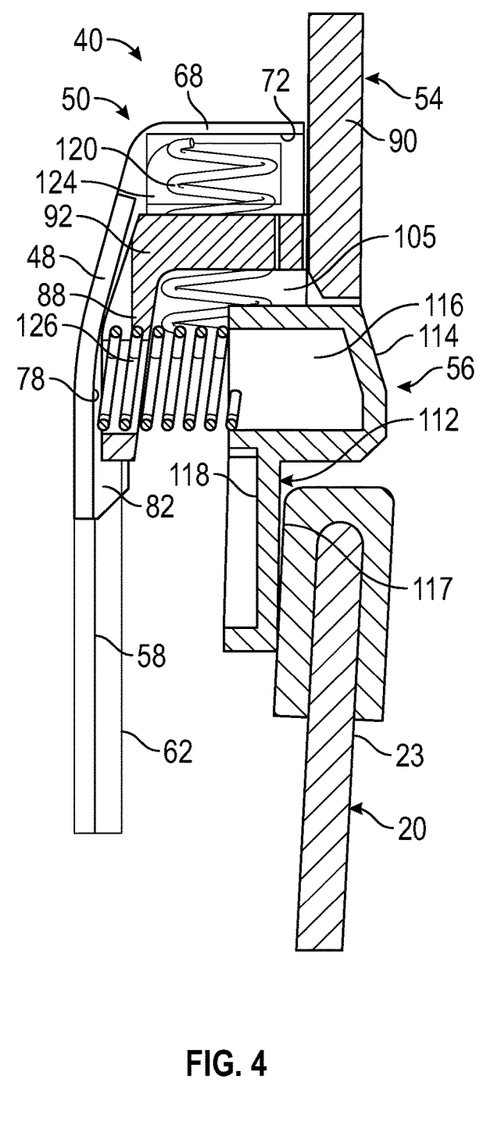
FIG. 4 is a cross-sectional side view of the removable panel retainer engaging a removable panel, in accordance with a non-limiting example.

In a non-limiting example, housing 50 is further shown to include a first shield 68 and a second shield 70. First shield 68 includes a first inner surface 72 and second shield 70 includes a second inner surface 74. Housing 50 supports a first cantilevered flexible hook element 78 and a second cantilevered flexible hook element 80. First cantilevered flexible hook element 78 serves as a first selectively disengageable travel limiter 82 and second cantilevered flexible hook element 80 serves as a second selectively disengageable travel limiter 84. First and second selectively disengageable travel limiters 82 and 84 retain clip member 54 in a non-deployed configuration (FIG. 4). A spring support member 86 is disposed between first cantilevered flexible hook element 78 and second cantilevered flexible hook element 80 and extends along a second axis "A2" that is substantially perpendicular to the first axis "A1".

In a non-limiting example, clip member 54 includes a first section 88, a second section 90, and a third section 92 that joins first section 88 with second section 90. In a non-limiting example, first section 88 includes a first channel receiver 94 and a second channel receiver 96. First and second channel receivers 94 and 96 cooperate with first and second guides 62 and 64 as clip member 54 moves relative to surface 58 along the first axis "A1" as will be detailed herein. In a non-limiting example, second section 90 includes a removable panel retainer 104 that secures removable panel 20 to midgate 28. That is, second section 90 is spaced from first section 88 by a gap 105 that may receive and retain removable panel 20.

In a non-limiting example, release member 56 includes an actuator surface 112 that is selectively engaged by removable panel 20 and a blocking member 114 that prevents clip member 54 from moving along the first axis A1. Blocking member 114 includes a hollow interior 116 (FIG. 4) and actuator surface 112 includes a first side (not separately labeled) defining an actuator surface 117 and a second side (also not separately labeled) including a channel 118 that may accommodate first cantilevered flexible hook element 78.

In a non-limiting example, a first spring 120 and a second spring 122 are arranged between surface section 92 and inner first inner surface 72 and second inner surface 74 of first and second shield members 68 and 70 respectively. First spring 120 is arranged about spring support 124. Similarly, second spring 122 is arranged about another spring support (not shown). A third spring 126 extends about spring support member 86 and into hollow interior 116 of blocking member 114. At this point, it should be understood that the number, location, and type of springs or biasing elements may vary.

Figure 5:
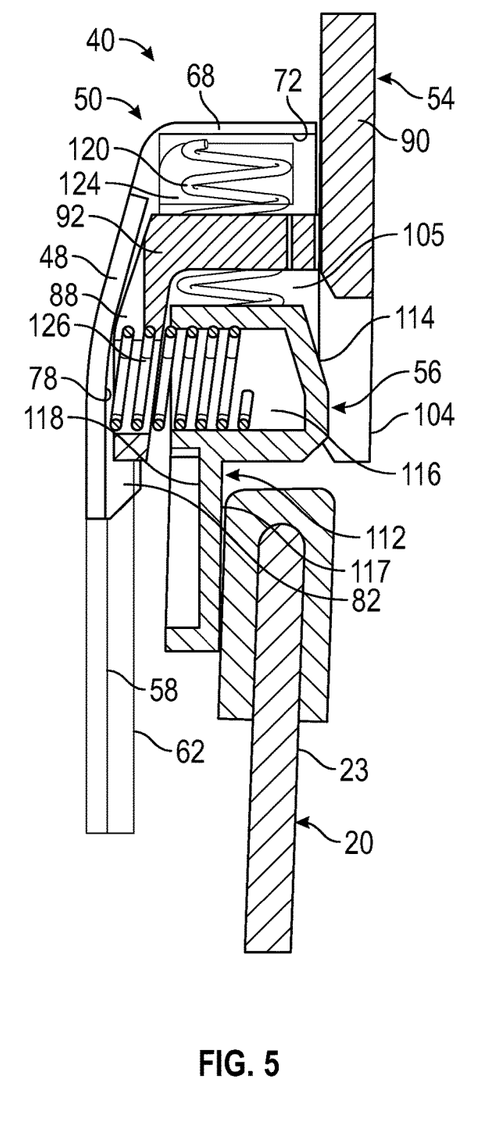
FIG. 5 depicts the removable panel moving against a release member of the removable panel retainer of FIG. 4, in accordance with a non-limiting example.
Figure 6:
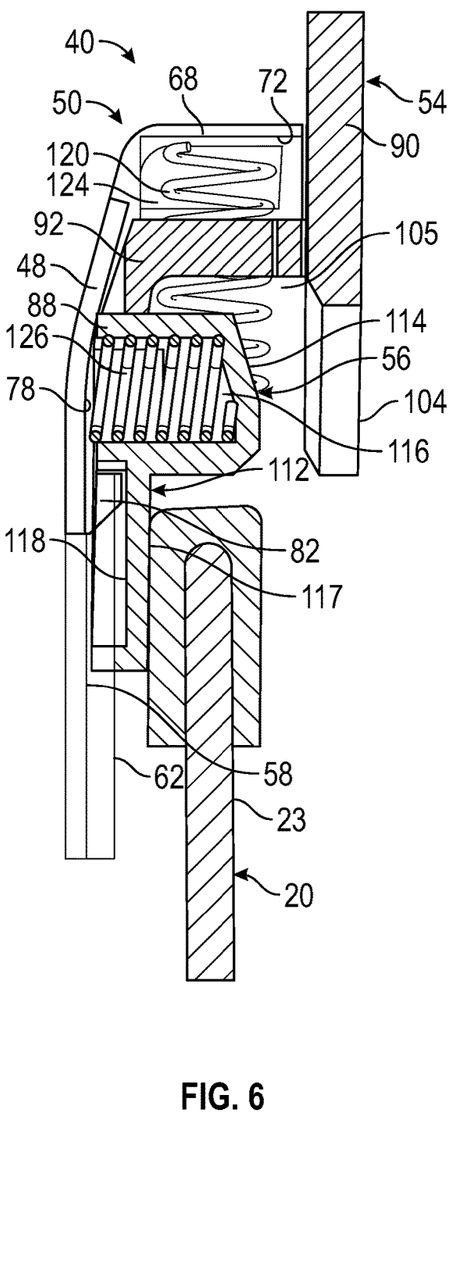
FIG. 6 depicts the removable panel moving further against the release member of the removable panel retainer of FIG. 5, in accordance with a non-limiting example.

In a non-limiting example, removable panel 20 is arranged adjacent to midgate 28 and urged against actuator surface 117 as shown in FIG. 4. Additional pressure causes release member 56 to compress third spring 126 and move along the second axis A2 toward surface 58 as shown in FIG. 5. Release member 56 is further moved along axis A2 such that channel 118 receives each of first cantilevered flexible hook element 78 and second cantilevered flexible hook element 80 as shown in FIG. 6.

Figure 7:
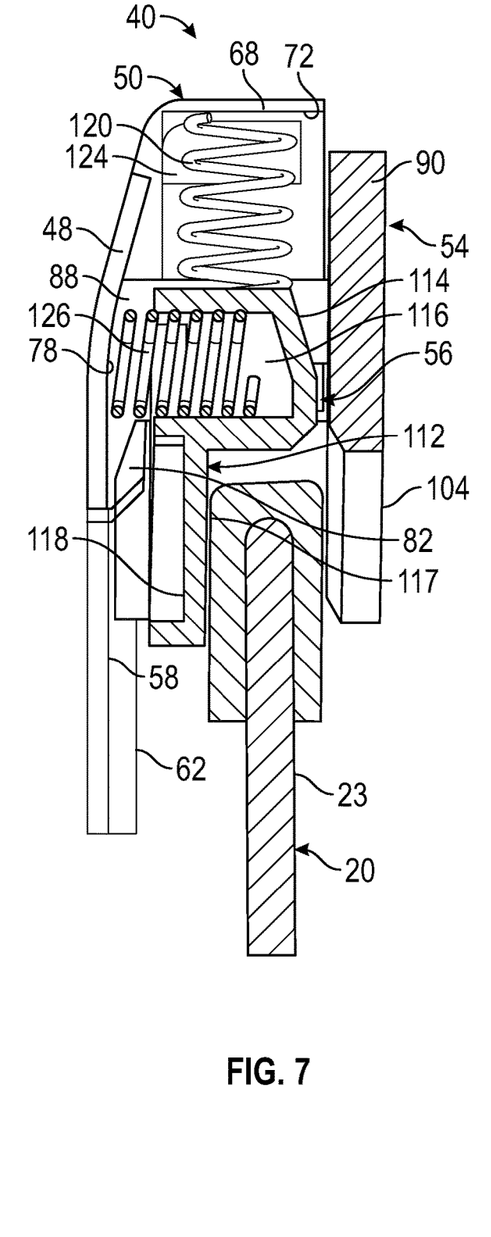
FIG. 7 depicts the release member of FIG. 6 disengaging from a clip member to secure the removable panel, in accordance with a non-limiting example.

Applying additional pressure to actuator surface 117 causes first and second cantilevered flexible hook elements 78 and 80 to deflect inwardly releasing clip member 54 as shown in FIG. 7. At this point, first and second springs 120 and 122 urge clip member 54 downward along first axis A1 such that removable panel 20 is captured by removable panel retainer 40 between first section 88 and second section 90. To release removable panel 20, simply press release member 56 and shift clip member 54 along first axis A2 in the opposite direction to compress first and second springs 120 and 122.

At this point, it should be understood that the non-limiting examples described herein provide a system for securing a removable panel in a vehicle against an internal surface in a vertical orientation. In the non-limiting example, shown, securing the removable panel to the midgate reduces internal space loss. Further, the midgate may be folded downward to provide additional space while, at the same time, safely securing the removable panel.

While the above disclosure has been described with reference to non-limiting examples, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular non-limiting examples disclosed, but will include all examples falling within the scope thereof.

What is claimed is:

1. A removable panel retainer for a vehicle having a midgate comprising:
    a flexible substrate fixedly mounted to the midgate of the vehicle, the flexible substrate including a surface defining a first axis;
    a clip member moveably mounted to the flexible substrate in a direction substantially parallel to the first axis; and
    a release member moveably mounted relative to the flexible substrate along a second axis that is distinct from the first axis, wherein shifting the release member towards the flexible substrate releases the clip member to shift along the first axis.

2. The removable panel retainer according to claim 1, wherein the flexible substrate comprises a housing mounted to a surface in the vehicle, the housing including at least one cantilevered flexible hook element.

3. The removable panel retainer according to claim 2, wherein the clip member includes a first section, a second section, and a third section, the second section being spaced from and joined to the first section by the third section.

4. The removable panel retainer according to claim 3, wherein the second section includes a removable panel retainer.

5. The removable panel retainer according to claim 3, wherein the release member includes an actuator element and a blocking member that extends outwardly from the actuator element, the blocking member selectively engaging the second section of the clip member.

6. The removable panel retainer according to claim 5, wherein the blocking member includes a hollow interior and the actuator element includes a channel that is selectively receptive of the at least one cantilevered hook element.

7. The removable panel retainer according to claim 6, wherein the housing includes a spring support member that selectively extends into the hollow interior of the blocking member.

8. The removable panel retainer according to claim 7, further comprising a spring arranged on the spring support member, the spring biasing the release member away from the housing along the second axis.

9. The removable panel retainer according to claim 3, further comprising a spring arranged between the third section and the housing, the spring biasing the clip member along the first axis toward the at least one cantilevered flexible hook element.

10. The removable panel retainer according to claim 9, wherein the third section includes a spring support, the spring being arranged about the spring support.

11. A vehicle comprising:
    a body including a removable panel and a surface defining a midgate defining a first axis;
    a plurality of wheels supporting the body; and
    a removable panel retainer mounted to the surface, the removable panel retainer comprising:
        a flexible substrate defined on the midgate;
        a clip member moveably mounted to the flexible substrate in a direction substantially parallel to the first axis; and
        a release member moveably mounted relative to the flexible substrate along a second axis that is distinct from the first axis, wherein shifting the release member towards the flexible substrate releases the clip member to shift along the first axis.

12. The vehicle according to claim 11, wherein the flexible substrate comprises a housing mounted to a surface in the vehicle, the housing including at least one cantilevered flexible hook element.

13. The vehicle according to claim 12, wherein the clip member includes a first section, a second section, and a third section, the second section being spaced from and joined to the first section by the third section.

14. The vehicle according to claim 13, wherein the second section includes a removable panel retainer.

15. The vehicle according to claim 13, wherein the release member includes an actuator element and a blocking member that extends outwardly from the actuator element, the blocking member selectively engaging the second section of the clip member.

16. The vehicle according to claim 15, wherein the blocking member includes a hollow interior and the actuator element includes a channel that is selectively receptive of the at least one cantilevered hook element.

17. The vehicle according to claim 16, wherein the housing includes a spring support member that selectively extends into the hollow interior of the blocking member.

18. The vehicle according to claim 17, further comprising a spring arranged on the spring support member, the spring biasing the release member away from the housing along the second axis.

19. The vehicle according to claim 13, further comprising a spring arranged between the third section and the housing, the spring biasing the clip member along the first axis toward the at least one cantilevered flexible hook element.

20. The vehicle according to claim 19, wherein the third section includes a spring support, the spring being arranged about the spring support.

\* \* \* \* \*